(12) United States Patent
Groening

(10) Patent No.: US 7,564,157 B2
(45) Date of Patent: Jul. 21, 2009

(54) INTERIOR PERMANENT MAGNET SYNCHRONOUS MACHINE

(75) Inventor: Ingolf Groening, Lohr am Main (DE)

(73) Assignee: Rexroth Indramat GmbH, Lohr am Main (*) Notice: Subject to any disclaimer, the term of this patent is extended or adjusted under 35 U.S.C. 154(b) by 415 days.

(21) Appl. No.: 10/545,825

(22) PCT Filed: Oct. 29, 2003

(86) PCT No.: PCT/EP03/11968

§ 371 (c)(1),
(2), (4) Date: May 15, 2006

(87) PCT Pub. No.: WO2004/075378

PCT Pub. Date: Sep. 2, 2004

(65) Prior Publication Data

US 2006/0244331 A1      Nov. 2, 2006

(30) Foreign Application Priority Data

Feb. 21, 2003   (EP)   ................................. 03003937

(51) Int. Cl.
*H02K 21/12* (2006.01)

(52) U.S. Cl. ............................ 310/156.53; 310/156.44; 310/216; 310/261

(58) Field of Classification Search ................. 310/156.43–156.57, 216, 261, 254, 179, 310/184

See application file for complete search history.

(56) References Cited

U.S. PATENT DOCUMENTS

| | | | | |
|---|---|---|---|---|
| 5,811,904 A | | 9/1998 | Tajima et al. | |
| 5,990,592 A | * | 11/1999 | Miura et al. | 310/156.53 |
| 6,211,593 B1 | * | 4/2001 | Nashiki | 310/156.33 |
| 6,759,778 B2 | * | 7/2004 | Nishiyama et al. | 310/156.53 |
| 6,815,859 B2 | * | 11/2004 | Sakuma et al. | 310/156.53 |
| 2002/0145353 A1 | * | 10/2002 | Kimura et al. | 310/156.57 |
| 2004/0256940 A1 | * | 12/2004 | Tsuruta et al. | 310/156.53 |

FOREIGN PATENT DOCUMENTS

EP   0 823 771   2/1998

OTHER PUBLICATIONS

Chapter 6 of "Brushless Permanent-Magnet and Reluctance Motor Drives" by T.J. Miller, pp. 118-148. ISBN 0-19-859369-4, Jun. 1989 (in English).

* cited by examiner

*Primary Examiner*—Thanh Lam
(74) *Attorney, Agent, or Firm*—Michael J. Striker

(57) ABSTRACT

A rotating A.C. synchronous interior permanent magnet machine with concentrated windings is constructed such that each pole on the secondary-side (rotor) is provided with at least one interior axial slot (1), with dimensions h1 (6), h2 (7) and d (9), with h1 (6) being the radial material thickness of the secondary side between the air-gap surface of a slot (1) and the secondary side air-gap surface, h2 (7) being the radial thickness of the secondary side between the inner surface of the secondary side and the inner side surface of the at least one slot and d (9) being the thickness of the secondary side, whereby the ratio (formula I) lies in the range 0.05-0.35.

18 Claims, 6 Drawing Sheets

INTERIOR PERMANENT MAGNET SYNCHRONOUS MACHINE

CROSS-REFERENCE TO A RELATED APPLICATION

The invention described and claimed herein below is also described in European Patent Application EP 03003937.4 filed on Feb. 21, 2003. This European Patent Application provides the basis for a claim of priority of invention under 35 U.S.C. 119(a)-(d).

BACKGROUND OF THE INVENTION

The present invention relates to an interior permanent magnet, synchronous machine or IPMSM, with concentrated windings, capable of field weakening operation.

Interior magnet motors have been reported in the literature, and their torque generation characteristics are well understood, an example of this kind of machine can be found in EP 0 823 771 and a technical description of the method of torque generation in Chapter 6 of "Brushless Permanent-Magnet and Reluctance Motor Drives" by T. J. Miller ISBN 0-19-859369-4.

The general advantage of this kind of motor is its ability to generate both a synchronous torque and a reluctance torque which, given a suitable power amplifier, can be independently controlled allowing it to run at speeds far higher than the natural synchronous speed of the motor, and thus to deliver torque and power over a very wide speed range.

A further advantage is the efficiency of the winding method which allows maximum fill-factor while elimination the end-winding losses of a distributed winding construction. The wide speed range capability of a IPMSM is a widely used feature of the standard induction motor, a feature which is not available to any useful extent with a standard synchronous permanent magnet motor. Synchronous motors are however more dynamic than equivalently sized induction motors, i.e. in rotational motors the ratio of torque to rotor inertia can be greater for the synchronous machine, and they would be useful in machine tool applications such as spindle drives were it not for the maximum speed limitation. The IPMSM in conjunction with a suitable active power source overcomes this limitation.

The problem with currently available motors are that their operating speed range is too narrow, and their secondary side (rotor) construction tends to complicated by a requirement for special cut-outs or unusual forms or shapes in order to generate the required difference between the direct and quadrature axis inductance. It is unusual to find an IPMSM which has a speed range of much more than 5:1 i.e. where the ratio of the maximum allowable speed to base speed is greater than 5:1. As the base speed of a synchronous motor tends to be around 3000 rpm, this makes it difficult for such motors to be used in applications where speeds of more than about 15,000 rpm are required. Many spindle drives run at 25,000 rpm or more which requires a field-weakening range of around 9:1 which is not possible with any currently available design.

SUMMARY OF THE INVENTION

Accordingly, it is an object of the present invention to overcome the speed range limitations and manufacturing complexities of current designs of IPMSM's.

A rotating A.C. synchronous interior permanent magnet machine with concentrated windings is constructed such that each pole on the secondary-side is provided with at least one interior axial slot (1), with dimensions h1, h2 and d, with h1 being the radial material thickness of the secondary side between the air-gap surface of a slot and the secondary side surface, h2 being the radial material thickness of the secondary side between the inner surface and the inner-lying wall of the at least one slot and d being the thickness of the secondary side, whereby the ratio h1/d lies in the range 0.05-0.35 Furthermore the range of values of h2/d is in the range 0.4-0.8. The ranges for the ratios of h1/d and h2/d in this design allow the permanent magnets to be located very close to the surface of the secondary side and also allow the total thickness of the secondary side to be reduced, and/or thicker magnet material to be used. Thus in a cylindrical motor, for a given motor diameter, the motor shaft can have a larger diameter which provides a greater shaft stiffness and thus better motor performance. The dimensions of the iron above and below the permanent magnets also define the magnetic flux paths through the motor and the levels of saturation and thus the inductance or reluctance of these paths. The combination of the geometry of the iron and that of the magnets are the key to increasing the speed range of the motor.

A range of possible values for the ratios h1/d and h2/d exist within which the motor has enhanced field weakening characteristics, however design and experimentation has shown that a range of 0.18-0.23 for h1/d and a range of 0.55-0.63 for h2/d offer optimum mechanical stability and electromagnetic performance.

The clear advantage of reduced cogging torque has been achieved in this design by selecting the tooth geometry such that the width of the air-gap around the circumference of the machine is variable. Thus the detent-torques generated by the interaction of each tooth and magnetic pole are not in phase and tend to cancel when summed around the machine.

An optimal solution is the use of a simple rectangular tooth profile in the primary side laminations resulting in a substantially cuboid tooth and thus a flat air-gap surface which creates a variable airgap with the curved surface of the rotor of the machine.

Advantageous, in the construction of a rotating machine, is the use of trapezoidal secondary side slots which mean that the section of material formed between two such adjacent slots has substantially parallel sides. This minimises the volume of iron material in the section and reduces the hysteresis losses in the machine.

Crucial to the application of the invention to rotating machines is the fact that the concentrated winding construction of the machine generates a rotating flux which is rich in harmonics, This design is optimised for operation with the first harmonic which is at double the fundamental frequency of the air-gap flux, has a shorter wavelength and can be forced to flow in paths through the iron that the fundamental frequency can not.

A further beneficial aspect of the invention can be seen in its application to a linear machine whereby the useful ratios of h1/d and h2/d have been found to be 0.05-0.35 and 0.4-0.8 respectively.

Further optimisation of the invention have shown that for linear machines ratios of h1/d and h2/d of 0.18-0.23 and 0.55-0.63 provide optimal mechanical and electromagnetic characteristics.

The benefits of applying a concentrated winding construction to a linear realisation of the invention can be seen in that there is a moving flux field created by the interaction of the phase currents and the windings which is rich in harmonics, the design being specifically and beneficially optimised for the first harmonic.

A further benefit of the invention is the reduction of cogging torque in a linear motor implementation achieved by designing the tooth geometry such that the air-gap between the tooth face and the secondary side varies across the width of the tooth thus causing the detent-torques due to the interaction of the teeth with the permanent magnetic field of the motor from summing constructively along the length of the motor.

In a further beneficial form of the invention, a linear motor can be constructed such that the cogging torque is minimised by one or all of the following:

a) Use of variable thickness magnets b) Use of magnets with variable flux density across their width Both of these result in variable flux density in the motor air-gap and minimised detent or cogging torque.

Yet a further advantage of the construction is that it allows a motor to be designed with a smooth secondary side surface. This substantially reduces the costs of manufacturing the machine.

A further benefit of the invention is the design of the slots that allows the use of 1 magnet per slot. Each the magnet can be simply pushed into each secondary side slot thus significantly simplifying the construction of the motor and reducing its manufacturing costs. This is achieved by choosing the width of the magnet to be somewhat less that the wavelength of the relevant frequency of the flux field, thus ensuring that there is no circulating flux within the body of a magnet and thus reduced losses.

A further beneficial aspect of the invention is the design of the slots and their separation which ensures that the section of material between slots within one secondary side pole is as small as possible and preferably parallel sided regardless of motor type ensuring reduced iron losses in the machine.

A further advantage of the invention can be seen in the minimisation of the volume of material in the sections of iron between the slots within one secondary side pole with the result that the iron is permanently in magnetic saturation even at low flux levels thus further minimising the iron losses in the machine.

In a yet further advantage of the invention, the proximity of the slots to the surface of the secondary side allows the permanent magnet material to be inserted into the slots in a non-magnetised state which is far easier than handling magnetised material, and for the permanent magnet material to be magnetised after construction. This is possible because the very short iron paths through which the magnetising flux must flow allow the process to be accurately controlled.

BRIEF DESCRIPTION OF THE DRAWINGS

The invention can be more clearly understood by reference to the following diagrams.

DESCRIPTION OF THE PREFERRED EMBODIMENTS

Figure 1:
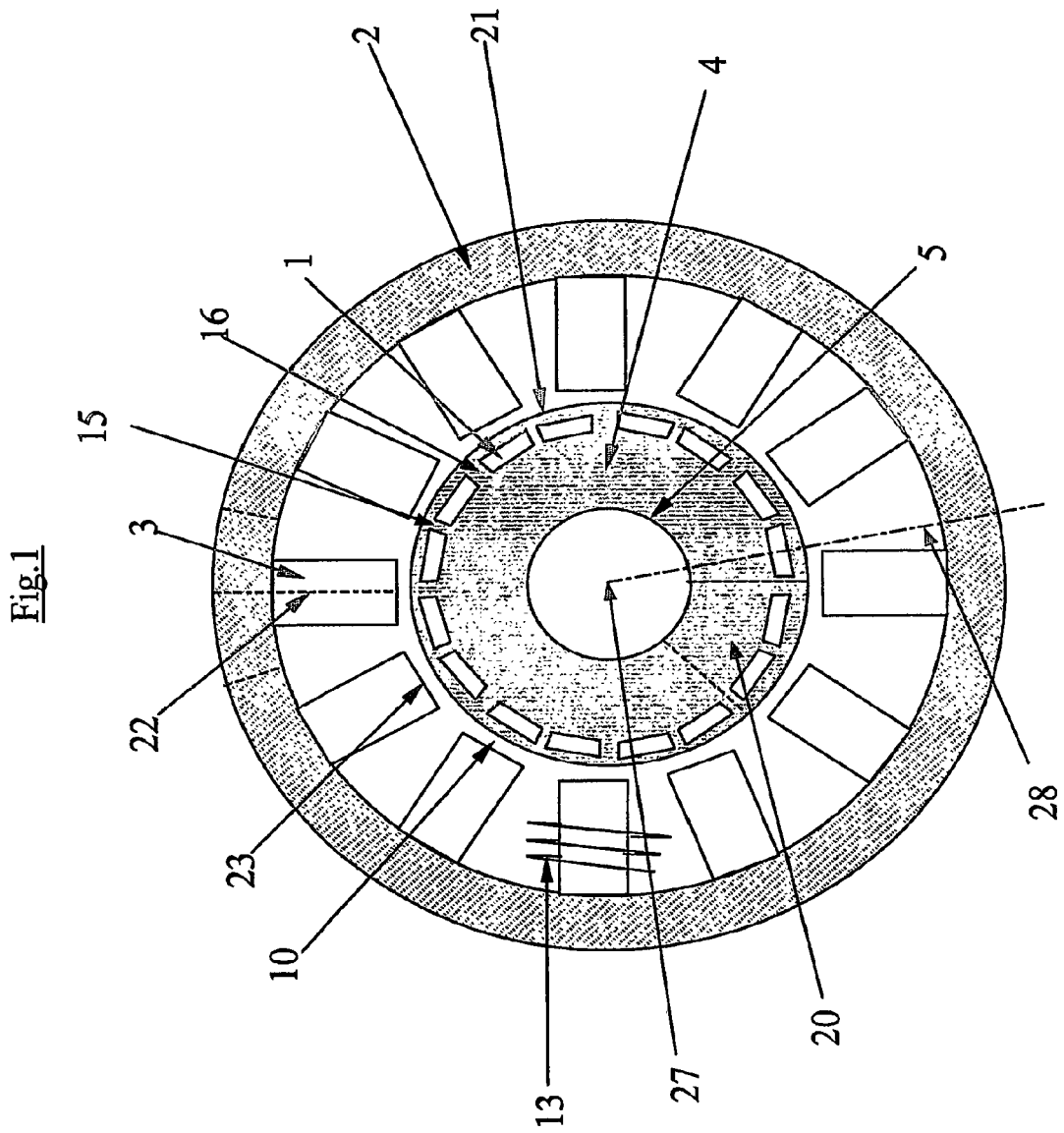
FIG. 1 shows an axial view of a rotating machine according to the invention
Figure 2:
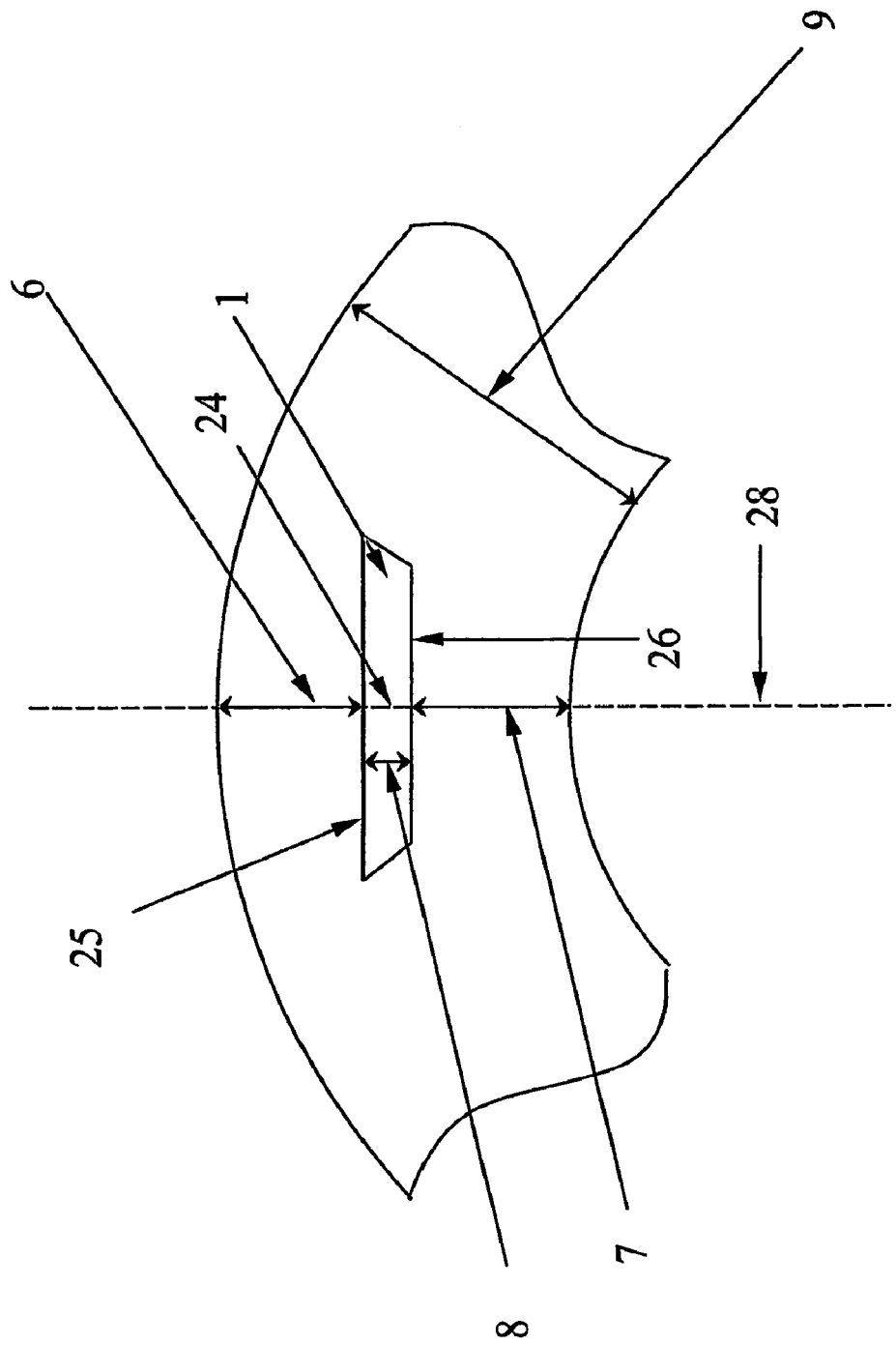
FIG. 2 shows an expanded axial view of a single slot of the rotational machine of FIG. 1

FIG. 1 shows an axial view of a rotational machine according to the teachings of the invention with a number of individual teeth 3 distributed symmetrically around the periphery of the primary side 2. Each tooth 3 having one winding 13 and each tooth 3 having a flat lower surface 23 which creates the required variable width air gap 10 for minimisation of the detent or cogging torque in the machine. The secondary side 4 is a laminated iron construction with the magnet slots 1 being stamped or otherwise formed in each individual laminations, the laminations being stacked together to form the secondary side 4 of the motor. In FIG. 2 it can be readily seen that each slot 1 is substantially trapezoidal in form, the centre line of each slot 24 lying on a radius of the machine 28 with the result that the section of material 15, 16 between slots is parallel sided and rectangular in shape. Rectangular slots 1 would result in larger trapezoidal sections of material 15 and increased iron losses as the sections of iron 15 would tend to remain in the linear operating range of their B-H curve up to higher flux levels, thus adding to the hysteresis and iron losses in the secondary side. These sections 15 are necessary to stabilise the secondary side mechanically for high-speed operation.

The sections of iron 16 between secondary side poles 20 is wider than that 15 between slots within a pole 20, and is designed such that the section of material 16 is driven into saturation during normal operation thus increasing the inductance of the path along the q axis of the machine without the need to remove iron to create an air pocket in the flux path in order to increase the inductance. The advantage of this approach being that the material above and below the section 16 is not driven into saturation and is still capable of carrying the required magnetic flux generated by the permanent magnets and by the currents in the coils during normal operation i.e. the iron provides a lower reluctance path for the operating flux which would otherwise be forced to flow across the much higher reluctance air-gap of the machine generating a large voltage drop in the air-gap. The magnetic flux generated by the permanent magnets also flows through a shorter return path through the air gap further reducing the voltage drop across the air-gap reactance.

A further advantage of not requiring cut-outs or air pockets in the iron is that less tooling is required for production of the secondary side 4 laminations which significantly reduces the overall tooling costs and thus the volumes at which production becomes viable.

The shorter flux paths through the iron and the air-gap reduce the flux density in the back iron 7, i.e the iron below the slots 1, thus it becomes possible to reduce the thickness of this iron and thus increase the diameter of the motor shaft for a given motor size. The shaft diameter thus becomes a larger proportion of the overall diameter of the secondary side. This results in a stiffer shaft (less compliance) for a given motor torque and thus pushes mechanical resonances out to higher frequencies where they can be more easily filtered. The concentrated winding 13 design with no pole shoes also allows the diameter of the rotor or secondary side to be greater for a given overall motor diameter which results is a higher torque output.

Figure 3:
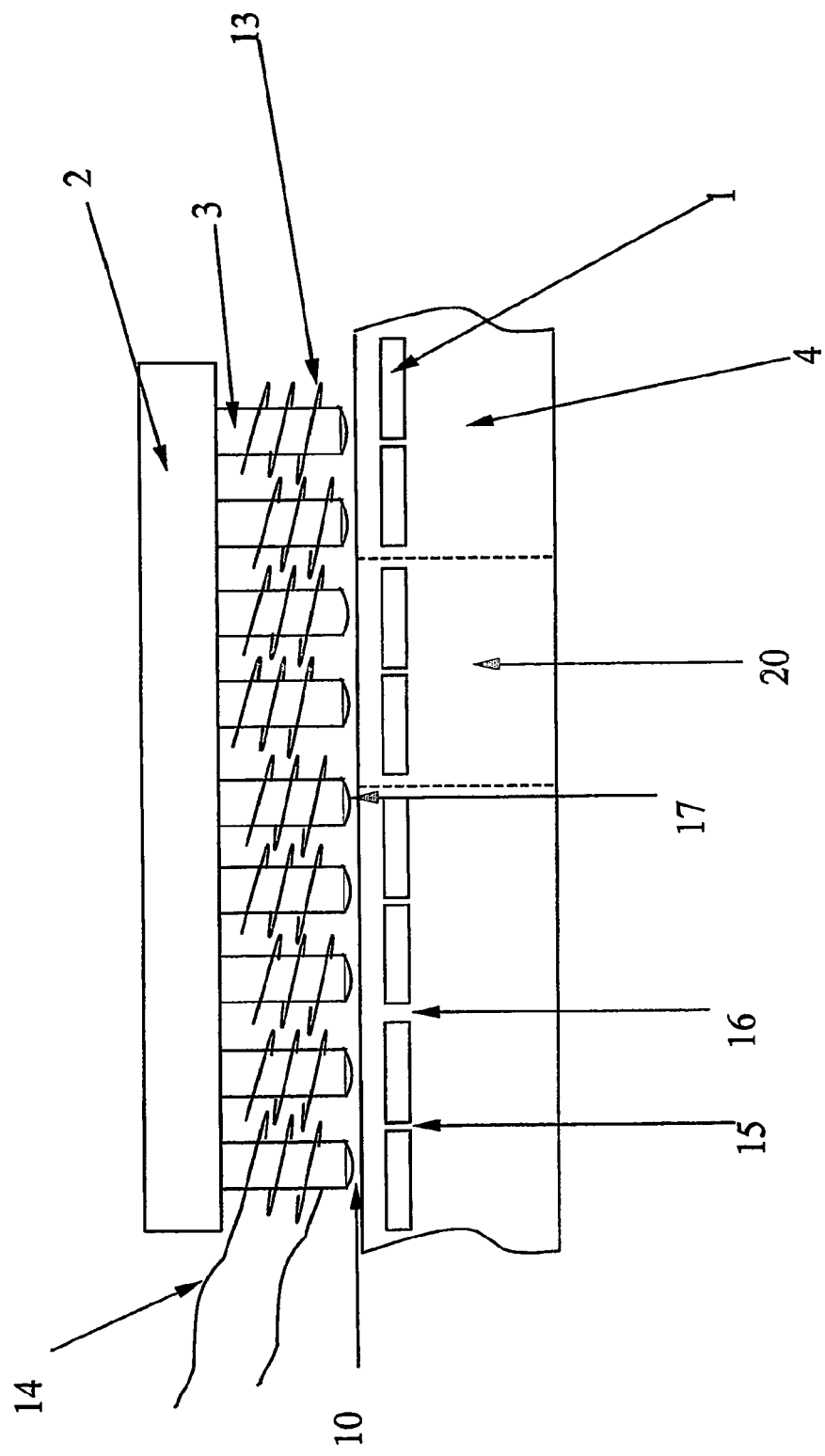
FIG. 3 shows a linear motor according to the invention with curved tooth faces
Figure 4:
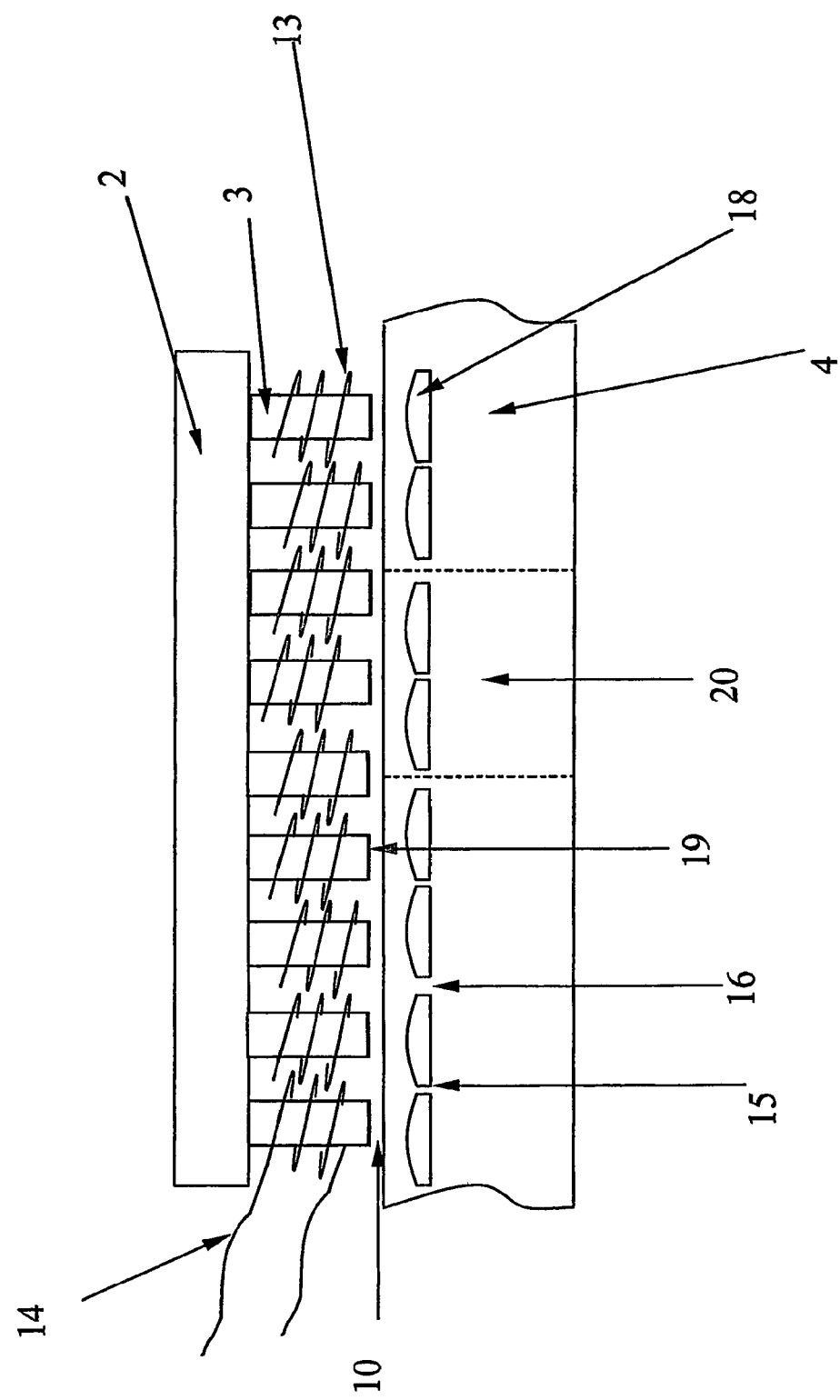
FIG. 4 shows a linear motor according to the invention with shaped magnets
Figure 5:
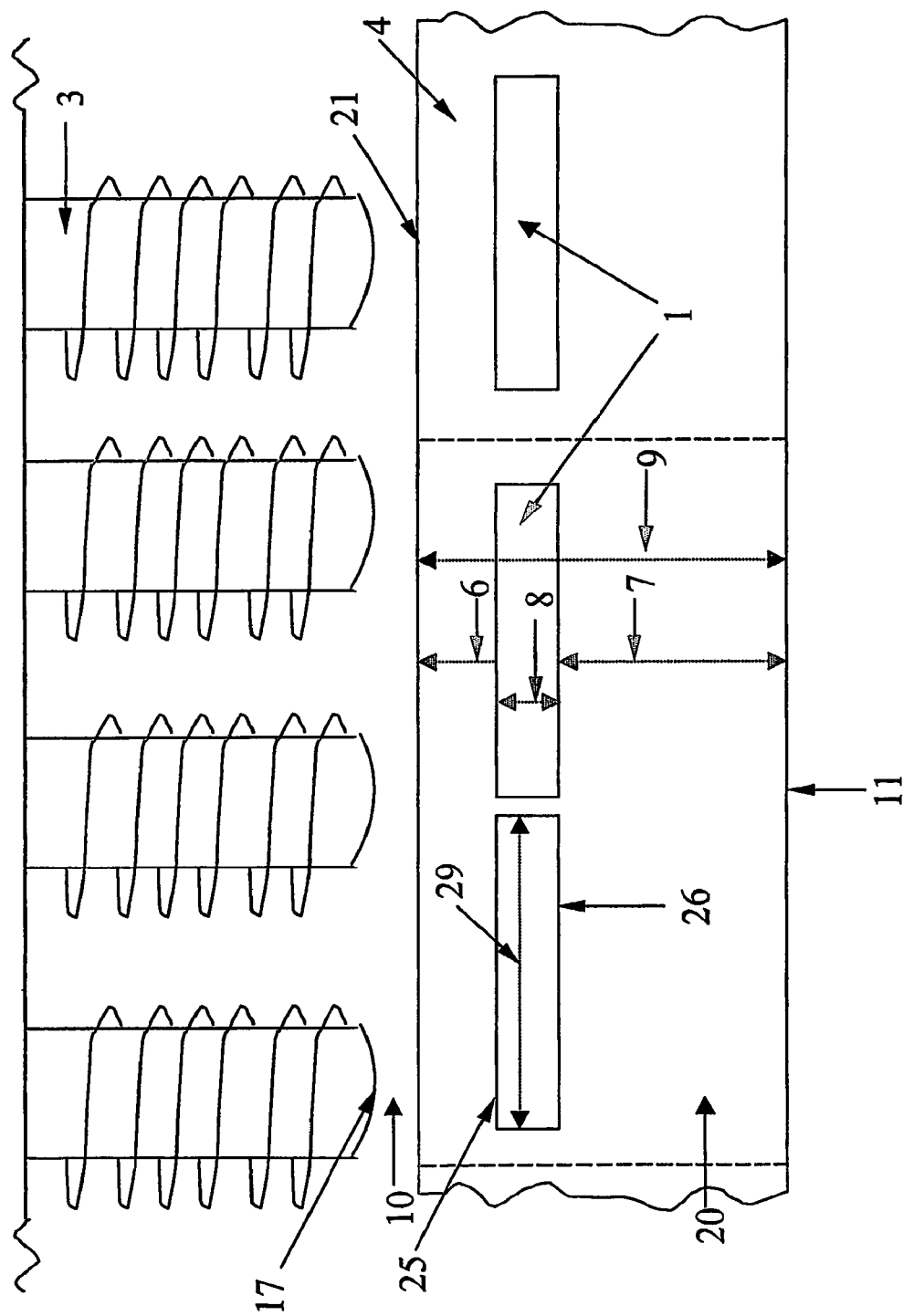
FIG. 5 shows a detailed view of the slots of the linear motor of FIG. 3
Figure 6:
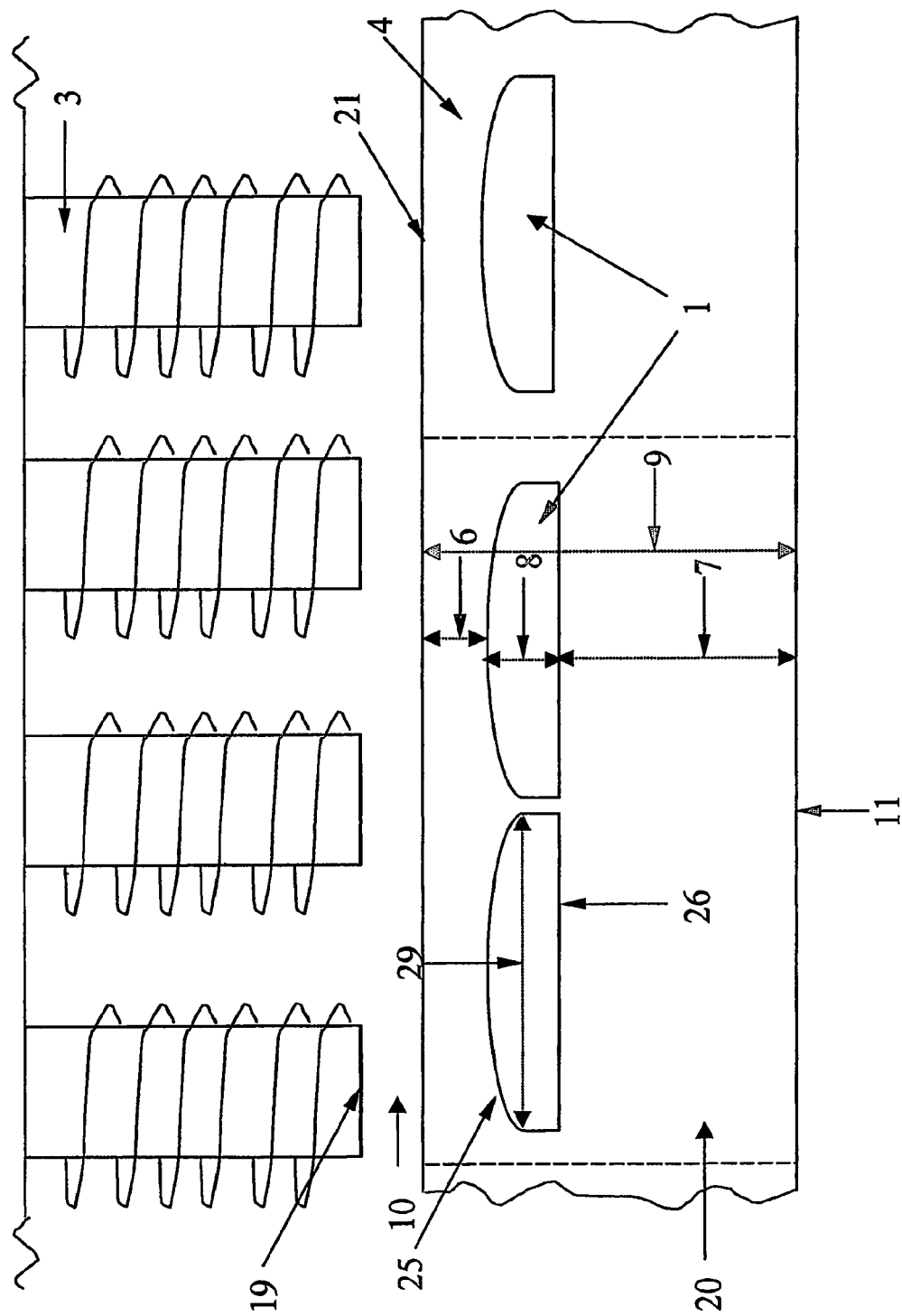
FIG. 6 shows a detailed view of the slots of the linear motor of FIG. 4

FIG. 3 shows a linear motor side elevation in section with primary side 2 and secondary side 4 whereby the primary side teeth 3 have curved faces 17 which results in a variable width air-gap 10 across the width of the tooth 3. This can be more clearly seen in FIG. 5. The linear machine does not require trapezoidal slots 1 as there is no curvature to deal with, and the inter-slot sections 15 and 16 remain parallel sided and minimised in iron volume. FIG. 6 shows a further method of generating a variable air-gap flux by using curved magnets 1 which provide a higher flux in the middle than at the edges due to the increased thickness of magnetic material. This then creates in turn a variable air-gap flux across the width of the slot and thus the primary side tooth. It would also be quite feasible to magnetise a rectangular magnet such that the flux produced by the magnet was variable across its width in order to achieve the same result.

The design of the machine also results in levels of d and q axis inductance which can be varied quite markedly with the level of primary side coil current.

The concentrated winding structure 13 and the ratio of secondary side to primary side poles 20 results in a rotating magnetic field in the air-gap 10 which contains a fundamental frequency and its harmonics whereby the secondary side 4 is designed to interact only with the first harmonic of the field to produce torque.

As the flux paths through the secondary side are optimised as already described, it is possible to simplify the geometry of the secondary side and to do without the complex cut-outs which are commonly used to physically define the flux paths through the secondary side and the value of Lq, and which can also disturb the air-gap flux causing further unwanted harmonics of flux in the air-gap and hysteresis losses; it is thus possible to have a completely smooth secondary side surface and to have a substantially continuous iron path along the machine quadrature axis.

The width of a secondary side slot 29 is designed to be less than the wavelength of the first harmonic of the rotating electromagnetic flux field, preventing a closed flux path from forming within the dimensions of a slot 1 and thus preventing circulating currents from flowing in the magnets within the slots 1. The dimensions 6, 7, 9, of the secondary side 4 for a given motor are normally fixed, i.e. do not vary around or along the motor, although there could be further optimisations which require such modifications in order to further optimise the q and d axis inductances by modifying the d and q flux paths.

FIGURE REFERENCES

1 Secondary side slot/magnet
2 Primary side
3 Primary side tooth
4 Secondary side
5 Secondary side inner surface
6 h1 dimension
7 h2 dimension
8 Slot height or magnet thickness
9 Thickness of secondary side iron
10 Air-gap
11 Secondary side base
12
13 Primary side winding
14 Winding to phase connection
15 Stabilising segment
16 Inter-pole segment
17 Curved tooth face
18 Shaped secondary side slot and/or magnet
19 Flat tooth face
20 Secondary side pole
21 Secondary side outer surface
22 Tooth centre line
23 Air-gap facing tooth side
24 Slot centre line
25 Slot air-gap surface
26 Slot inner surface
27 Machine axis
28 Radius
29 Slot width

The invention claimed is:

1. An A.C. synchronous interior permanent magnet machine, comprising concentrated windings; a plurality of poles each provided on a secondary side with at least one slot, with a material thickness h1 of said secondary side between an air-gap surface of said at least one slot and a secondary side surface, with a material thickness h2 between an inner lying surface of the at least one slot and an inner surface, and with a thickness d of said secondary side, wherein the ratio h1/d lies within a range 0.05-0.35, wherein the poles on the secondary side are configured so that a section of iron between the poles on the secondary side is wider than a section of iron between said slots within the pole and is configured such that the section of iron is driven into saturation during normal operation thus increasing an inductance of a path along an axis of the machine without a need to remove the iron to create an air uocket into a flux path in order to increase an inductance.

2. An A.C. synchronous interior permanent magnet machine as defined in claim 1, wherein the ratio h1/d lies within the range 0.18-0.23.

3. An A.C. synchronous interior permanent magnet machine as defined in claim 1, wherein a ratio h2/d lies within the range 0.4-0.8.

4. An A.C. synchronous interior permanent magnet machine as defined in claim 1, wherein a ratio h2/d lies within the range 0.55-0.63.

5. An A.C. synchronous interior permanent magnet machine as defined in claim 1, wherein the machine is configured as a rotating A.C. synchronous interior permanent magnet machine, wherein a radius is drawn from an axis of the machine through a center line of said at least one interior slot is substantially normal to a surface formed by the air-gap side of said slot, wherein said slot is formed as at least one interior axial slot which is opened at least at one axial end, wherein h1 is a radial material thickness of said secondary side between said air-gap surface of said at least one slot and said secondary side surface measured along said radius, wherein h2 is a radial material thickness of said secondary side between said inner surface and said inner-lying wall of said at least one slot measured along said radius, and wherein d is a radial thickness of said secondary side.

6. An A.C. synchronous interior permanent magnet machine as defined in claim 5, wherein primary side windings and associated phase currents are such that they generate a rotating electromagnetic flux field at a fundamental frequency and at harmonics of said frequency, with a dominant frequency being a first harmonic.

7. An A.C. synchronous interior permanent magnet machine as defined in claim 5, wherein said air-gap side of each primary side tooth is configured such that a combination of a tooth geometry and of said secondary side produces a variable width air-gap circumferentially around the machine.

8. An A.C. synchronous interior permanent magnet machine as defined in claim 6, wherein each primary side tooth is substantially cuboid, wherein said air gap facing side is substantially flat generating the width air-gap with a curved surface of the secondary side.

9. An A.C. synchronous interior permanent magnet machine as defined in claim 5, wherein said at least one slot has a substantially trapezoidal shape.

10. An A.C. synchronous interior permanent magnet machine as defined in claim 1, wherein said machine is configured as a linear A.C. synchronous interior permanent magnet machine with each said slot running substantially parallel to an air-gap facing surface of said machine secondary side.

11. An A.C. synchronous interior permanent magnet machine as defined in claim 10, wherein a geometry of at least one air-gap facing tooth side on a primary side is such that a width of an air-gap varies across that dimension of a tooth which is parallel to a direction of motion of a magnetic flux.

12. An A.C. synchronous interior permanent magnet machine as defined in claim 10, wherein at least one permanent magnet is configured as a permanent magnet selected from the group consisting of a permanent magnet having a non-constant thickness such that a strength of a magnetic field due to the magnet varies across its width, the at least one permanent magnet is magnetized such that a strength of the magnetic field due to the magnet varies across its width, and both.

13. An AC. synchronous interior permanent magnet machine as defined in claim 1, wherein said secondary side surface is substantially smooth.

14. An A.C. synchronous interior permanent magnet machine as defined in claim 1, wherein each said slot contains only one substantially slot-sized permanent magnet whose width is less than a wavelength of a first harmonic component of a magnetic flux.

15. An AC. synchronous interior permanent magnet machine as defined in claim 1, wherein a ferro magnetic material forming a physical barrier between any two adjacent secondary side slots in two adjacent secondary side poles is substantially parallel sided.

16. An A.C. synchronous interior permanent magnet machine as defined in claim 1, wherein a ferro magnetic material forming a physical barrier between any two adjacent secondary side slots within one secondary side pole is substantially parallel sided.

17. An A.C. synchronous interior permanent magnet machine as defined in claim 16, wherein the material forming the barrier is a material which remains in magnetic situation under all specified operating conditions of the machine.

18. A method for producing a secondary side of an A.C. synchronous interior permanent magnet machine with concentrated windings as defined in claim 1, the method comprising the steps of inserting at least one pre-formed block of non-magnetized permanent magnet material into at least one secondary side slot; and then magnetizing a thusly completed secondary side in a magnetizing fixture to produce a desired permanent magnetization.

* * * * *